Sept. 17, 1935.  J. R. WRAY  2,014,641
CONTAINER FOR HOLDING AND DISPLAYING AUTOMOTIVE VEHICLE CERTIFICATES OR LIKE
Filed Aug. 18, 1934
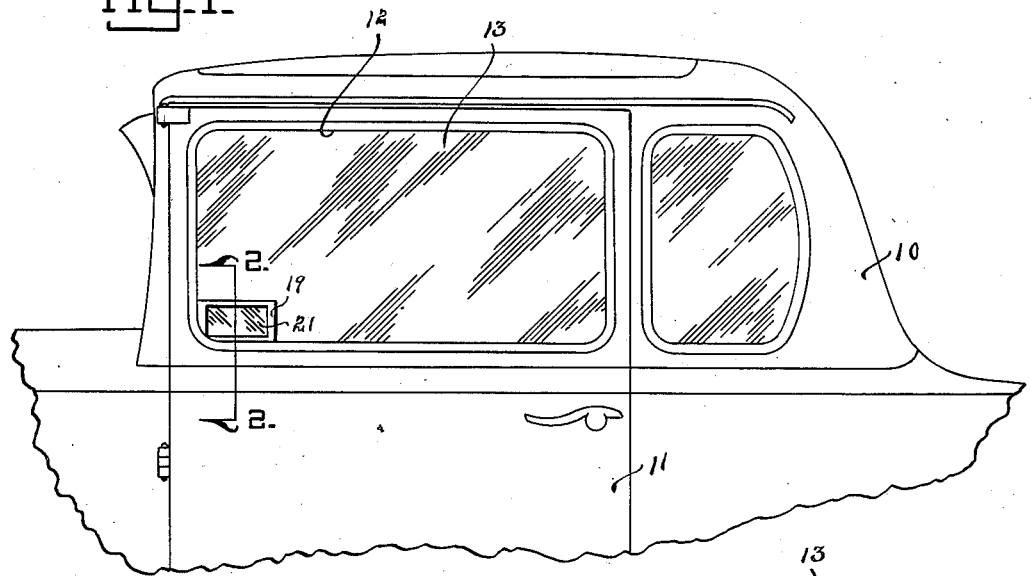
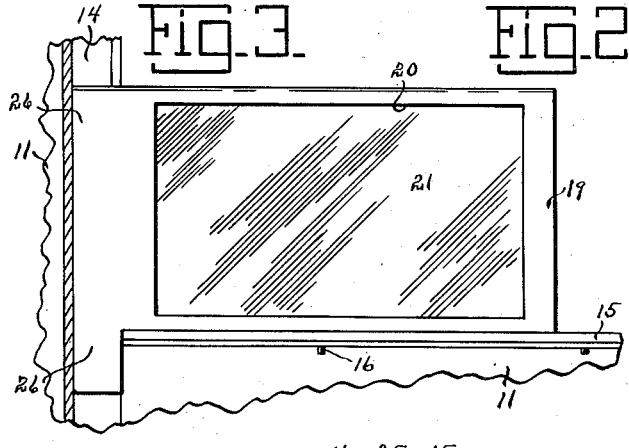
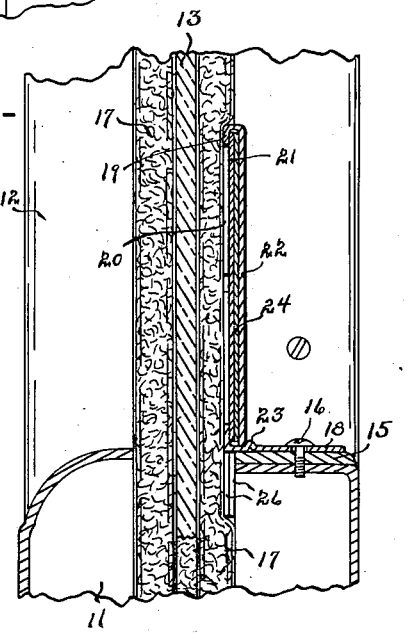
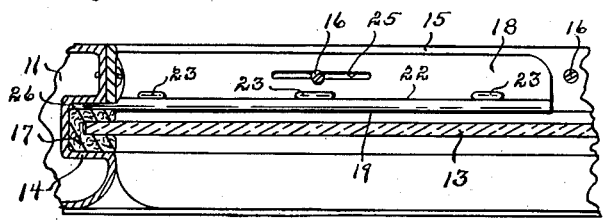
INVENTOR.
J. R. WRAY
BY
ATTORNEY.

Patented Sept. 17, 1935

2,014,641

UNITED STATES PATENT OFFICE 2,014,641

CONTAINER FOR HOLDING AND DISPLAYING AUTOMOTIVE VEHICLE CERTIFICATES OR LIKE

James R. Wray, Cantril, Iowa

Application August 18, 1934, Serial No. 740,481

5 Claims. (Cl. 40—10)

The principal object of my invention is to provide a certificate or like holder for use in automotive vehicles that is capable of so displaying the certificate or like that the same may easily be seen and read from a position outside of the vehicle even when the windows of the vehicle are closed.

A further object of this invention is to provide a container for holding and displaying automotive vehicle certificates, drivers' licenses, etc., that may be quickly attached to or detached from a vehicle by any one with a screw driver.

A still further object of my invention is to provide a certificate holder or container that is capable of having a certificate or like easily placed in the same or removed from the same.

A still further object of my invention is to provide a simple visible identification or certificate holder for use in vehicles such as automobiles, trucks, buses, or the like, that does not detract from the refined appearance of the seating compartment of the vehicle in which it is placed, and one that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Fig. 1 is an outside view of my container installed on an automobile and ready for use.

Fig. 2 is an enlarged cross-sectional view of the certificate holder mounted on a vehicle and is taken on line 2—2 of Fig. 1.

Fig. 3 is an enlarged outside view of my certificate holder installed on a vehicle with sections of the vehicle cut away to more fully illustrate the positions of the various parts of the holder relative to certain parts of the vehicle.

Fig. 4 is a top plan view of my certificate holder rigidly secured to the door or like of an automotive vehicle.

Many States of the Union require the displaying of vehicle certificates, drivers' licenses, and the like inside the dirver's compartment of automotive vehicles. Most certificate holders, however, now on the market do not properly display the document held and it is almost impossible to read the document from a position outside of the vehicle when the windows are closed and the doors of the vehicle locked. Furthermore, many of these certificate holders are difficult to install and mar or permanently damage the interior of the seating compartment of the vehicle to which they are secured. I have overcome such objections by my holder or container, which I will now describe.

Referring to the drawing, I have used the numeral 10 to designate an ordinary automotive vehicle having a door 11. This door 11 is of the conventional type, having a window opening 12 in its upper portion and into which may be vertically moved the usual window glass 13. As is well known, the glass 13 slides upwardly and downwardly in a channel 14 formed at each side of the opening 12, which loosely embraces the two side edge portions of the glass 13. The numeral 15 designates the usual window panel secured to the door and at the bottom of the window opening 12 at a position just inside the glass 13. These panels 15 are almost universally secured to the door proper by a plurality of screws 16. In order to make the glass 13 weather tight when in an elevated position and to prevent it from rattling, weather strip material of rubber, felt, or like 17 is placed in each of the vertical channel portions 14 of the door and between the window glass and the channel, as shown in Fig. 4. It is to such an above described automotive vehicle door that I install my certificate holder. Except for the isinglass or like window of my certificate holder, the entire holder is formed from a single sheet of metal or like, as will be obvious from an inspection of the construction of the device. The numeral 18 designates the bottom base portion of the holder. This base portion is bent to conform with the upper surface of the horizontal window opening panel 15, as shown in the drawing. If the holder is to be used on the left door of the vehicle the outer front face 19 is bent upwardly from the outer marginal edge of the bottom base portion 18. This face portion 19 has a window opening 20, back of which is a transparent sheet 21 of celluloid, isinglass, glass, or like. The numeral 22 designates the back portion of the holder which is bent downwardly from the upper marginal edge of the front face 19. This back portion 22 covers the rear side of the transparent sheet 21 and extends downwardly to a point just above the upper surface of the base portion 18, as shown in Fig. 2.

The numeral 23 designates upwardly extending projections formed on the base 18 and normally engaging the outer side of the lower portion of the back 22 for preventing the undesirable spreading of the back portion of the holder from the front portion of the holder. The numeral 24 designates a certificate card, driver's license, or like, which is placed between the transparent sheet 21 and the back 22, as shown in Fig. 2. With the instrument 24 back of the transparent sheet 21 the indicia thereon may be easily read through the window opening 20 of the holder. To facilitate the easy removal or replacement of the certificate or like 24, the base portion 18 of the device may be sprung downwardly relative to the back portion 22 in order to permit the lower marginal edge of the back portion 22 to pass over the tops of the projections 23. With the back portion 22 free of the projections 23 it may be moved outwardly a substantial distance from the front face portion 19. With the certificate or like 24 in proper position back of the transparent sheet 21, the back portion 22 should be moved back of and in engagement with the projections 23 for tightly holding the certificate or like between itself and the transparent sheet 21. The numeral 25 designates a longitudinal slot in the base portion 18. The numeral 26 designates a flange portion integrally formed on the forward marginal edges of the front face portion 19 and back portion 22. These two flange portions are closely adjacent each other as they are beyond the container portion of the holder in which resides the instrument to be displayed and the transparent sheet 21, as shown in Fig. 4. These two adjacent portions 26 are positioned beyond the extreme forward end of the base portion 18 and extend downwardly to a position substantially below the base portion 18, as shown in Fig. 3.

To install by device on a door, it is merely necessary to remove one of the screws 16 near the forward end of the window panel 15 and insert the holder, whereby its portions 26 will extend between the inner side of the channel 14 and resilient element 17. With the base portion 18 resting on the window panel or sill 15, the removed screw 16 is inserted through the slot opening 25 and replaced in threaded engagement with the panel 15, as shown in Fig. 2. By this construction and arrangement of parts, it will be noted that the base portion 18 will be rigidly secured to the window panel 15 and the forward end portion of the device, which is represented by the numeral 26, will be yieldably held between the resilient material and channel 14 and that in such position the certificate or other instrument being displayed, may be easily read from a position outside of the vehicle, as shown in Fig. 1. Due to the minimum thickness of the two portions 26, the window 13 may be lowered or raised without interference by the certificate holder. By the portions 26 extending below the base portion 18, the certificate holder will be more rigidly held against accidental displacement from its vertical position. The slot opening 25 compensates for various positioned screws 16 on different makes of vehicles. To remove the device from a door it is merely necessary to remove the one screw 16. By placing the holder in the forward lower portion of the window opening 12, it is not only out of the way, but adds to the refined appearance of the vehicle. With a certificate or like so prominently displayed, an officer of the law can readily acertain the desired information therefrom and he can even ascertain from a car in motion whether or not the driver of the vehicle has such information on display.

Such a display of a vehicle certificate or like will also aid the owner of vehicles and others in locating his or other vehicles desired to be ascertained along the street where a plurality of vehicles are parked.

Some changes may be made in the construction and arrangement of my improved container for holding and displaying automotive vehicle certificates or like without departing from the real spirit and purpose of my invention, and it is my intention to cover by my claims any modified forms of structure or use of mechanical equivalents which may be reasonably included within their scope.

I claim:

1. In combination with a vehicle door having a window, an inner window sill, a vertical window glass channel guideway and a resilient strip element in the said guideway, a document container and displayer comprising a body portion having an opening and designed to contain the document to be held and displayed, a sheet of transparent material closing said opening, a base portion on the bottom of said body portion, a means for securing said base portion to said window sill, and a flange element on one end of said body portion extending into said guideway and between the wall of said guideway and said resilient material.

2. In combination with a vehicle door having a window, an inner window sill, a screw for holding said sill to the door, a vertical window glass channel guideway and a resilient element in the said guideway, a document container and displayer, a body portion having an opening and designed to contain the document to be held and displayed, a base portion on the bottom of said body portion rigidly held to said window sill by said screw, and a flange element on one end of said body portion extending into said guideway and between the wall of said guideway and said resilient element.

3. In a document holding and displaying device, a single strip of bendable material bent back upon itself to form a back portion and a front portion, a base portion integrally formed on the lower portion of said front portion bent at substantially right angles to said front portion and extending under the lower marginal edge of said back portion; said front portion having an opening, a sheet of transparent flexible material for closing said opening, and a projection formed on said base portion and extending upwardly adjacent the outer side of said back portion.

4. In a document holding and displaying device, a single strip of bendable material bent back upon itself to form a back portion and a front portion, a base portion integrally formed on the lower portion of said front portion bent at substantially right angles to said front portion and extending under the lower marginal edge of said back portion; said front portion having an opening, a sheet of transparent flexible material for closing said opening, a projection formed on said base portion and extending upwardly adjacent the outer side of said back portion, and a flange portion integrally formed on the forward marginal edge portions of each of said front and back portions; said flange portions extending forwardly and below said base portion.

5. In a document holding and displaying device, a single strip of bendable material bent back upon itself to form a back portion and a front portion, a base portion integrally formed on the lower portion of said front portion bent at substantially right angles to said front portion and extending under the lower marginal edge of said back portion; said front portion having an opening, a sheet of transparent flexible material for closing said opening, a projection formed on said base portion and extending upwardly adjacent the outer side of said back portion, and a vertical flange portion integrally formed on the forward portion of said front portion.

JAMES R. WRAY.